(12) United States Patent
Nishikawa et al.

(10) Patent No.: US 6,382,799 B1
(45) Date of Patent: May 7, 2002

(54) PROJECTION OPTICAL APPARATUS

(75) Inventors: Jun Nishikawa; Shigeru Sawamura; Katsuhiro Takamoto, all of Sakai (JP)

(73) Assignee: Minolta Co., Ltd., Osaka (JP)

( * ) Notice: Subject to any disclaimer, the term of this patent is extended or adjusted under 35 U.S.C. 154(b) by 110 days.

(21) Appl. No.: 09/621,157

(22) Filed: Jul. 21, 2000

(30) Foreign Application Priority Data

Jul. 27, 1999 (JP) .......................................... 11-211527

(51) Int. Cl.$^7$ .............................................. G03B 21/14
(52) U.S. Cl. ........................ 353/122; 353/81; 353/99; 348/771
(58) Field of Search .............................. 353/98, 99, 31, 353/33, 34, 37, 81, 122; 348/743, 771

(56) References Cited

U.S. PATENT DOCUMENTS

| | | | |
|---|---|---|---|
| 5,612,753 A | 3/1997 | Poradish et al. ............ | 348/743 |
| 5,633,755 A | 5/1997 | Manabe et al. ............. | 359/443 |
| 5,865,520 A * | 2/1999 | Kavanagh et al. ............ | 353/31 |
| 5,868,480 A | 2/1999 | Zeinali ........................ | 353/31 |
| 5,905,545 A | 5/1999 | Poradish et al. ............ | 348/743 |
| 5,917,558 A * | 6/1999 | Stanton ....................... | 348/743 |
| 6,005,722 A * | 12/1999 | Butterworth et al. ......... | 353/98 |
| 6,179,424 B1 * | 1/2001 | Sawamura ................... | 353/99 |
| 6,231,190 B1 * | 5/2001 | Dewald ....................... | 353/31 |
| 6,250,763 B1 * | 6/2001 | Fielding et al. .............. | 353/31 |

FOREIGN PATENT DOCUMENTS

| | | |
|---|---|---|
| JP | 9-96867 A | 4/1997 |
| JP | 9-98442 A | 4/1997 |
| WO | WO 96/36184 | 11/1996 |

* cited by examiner

*Primary Examiner*—William Dowling
(74) *Attorney, Agent, or Firm*—Sidley Austin Brown & Wood LLP

(57) ABSTRACT

A projection optical apparatus has a light source for emitting light, an illumination optical system for emitting as illumination light the light radiated from the light source, a Digital Micromirror Device™, having a plurality of micromirrors, for separating the illumination light into signal light and unnecessary light by varying, in accordance with a signal, the angles at which the individual micromirrors reflect the illumination light shone thereon, a total internal reflection prism composed of a first prism for totally reflecting and thereby directing the illumination light exiting from the illumination optical system to the Digital Micromirror Device™ and a second prism for transmitting the signal light reflected from the Digital Micromirror Device™, and a projection optical system for projecting the signal light transmitted through the second prism onto a projection surface. Here, the f/number Fa of the illumination optical system on the Digital Micromirror Device™ side thereof, the distance xa from the Digital Micromirror Device™ to the Digital Micromirror Device™ side pupil of the illumination optical system, the distance L from the optical axis position of the Digital Micromirror Device™ to the most off-axial position thereof, and the rotation $\theta_D$ angle of the micromirrors constituting the Digital Micromirror Device™ fulfill the following condition, assuming that Fa falls within a range $1/\{2 \sin(0.85\ \theta_D)\} \leq Fa \leq 1/\{2 \sin(0.3\ \theta_D)\}$:

$$L/[\tan\{\theta_D - \sin^{-1}(1/(2 \cdot Fa))\}] \leq xa \leq L/\tan(\theta_D - 0.87\ \theta_D)$$

8 Claims, 15 Drawing Sheets

PROJECTION OPTICAL APPARATUS

This application is based on application No. H11-211527 filed in Japan on Jul. 27, 1999, the entire contents of which are hereby incorporated by reference.

BACKGROUND OF THE INVENTION

1. Field of the Invention

The present invention relates to a projection optical apparatus, and particularly to a projection optical apparatus provided with a reflective type spatial light modulator, such as a Digital Micromirror Device™ (DMD™, manufactured by Texas Instruments Incorporated, hereafter referred to simply as a digital micromirror device or DMD), having a large number of micromirrors that vary the angle of refection of illumination light (i.e. the light with which they are illuminated) in accordance with a video signal so as to reflect only signal light (i.e. those portions of the illumination light that convey the image carried by the video signal) toward a projection optical system.

2. Description of the Prior Art

Recently, much attention has been paid to DMDs as light modulation devices for use in projection optical apparatuses. A DMD has a display surface having a large number of micromirrors arranged in a matrix, with each micromirror constituting a pixel of a displayed image. To achieve light modulation, the inclination of the individual micromirrors is driven and controlled independently so that each micromirror is in one of two differently inclined states at a time, namely either in an ON state or in an OFF state. Micromirrors in their ON state reflect illumination light toward the inside of a projection optical system, and micromirrors in their OFF state reflect illumination light toward the outside of the projection optical system. Thus, only those portions of illumination light that have been reflected by micromirrors in their ON state travel through the projection optical system to reach a projection surface (for example, a screen surface), thereby forming a displayed image, which is a pattern consisting of differently bright spots, on the projection surface.

A first conventional example of a projection optical apparatus provided with a DMD as described above is shown in FIG. 16. In FIG. 16, at (A) is shown the positional relationship between the image circle (3) formed by a projection optical system (PL) and a DMD (2), and at (B) is shown a principal portion of the projection optical apparatus as seen from a direction perpendicular to the optical axis (AX1) of the projection optical system (PL). The projection optical system (PL) has a non-telecentric construction. There is also provided an illumination optical system (IL) that is composed of lens elements including a D-shaped lens element (the other lens elements are not shown in the figure) and that has an optical axis AX2. The light having passed through the illumination optical system (IL) illuminates the DMD (2) from an oblique direction at an angle of 45° relative thereto. The DMD (2) has micromirrors that are each so configured as to be in one of two differently inclined states relative to an axis (ax) at a time, namely either in an ON state or in an OFF state. Thus, micromirrors in their ON state reflect the light toward the inside of the projection optical system (PL), and micromirrors in their OFF state reflect the light toward the outside of the projection optical system (PL). As a result, the light reflected by micromirrors in their ON state forms a displayed image on a projection surface (1).

In this first conventional example, to achieve separation of the optical path of the projection optical system (PL) from the optical path of the illumination optical system (IL), it is necessary to secure an unduly large image circle diameter. Specifically, as shown at (A) in FIG. 16, only a small portion of the image circle (3) can be used for the arrangement of the DMD (2). For this reason, in a projection optical apparatus of a rear projection type that requires a wide angle of view, it is difficult to make the projection optical system (PL) satisfactorily inexpensive. Moreover, to avoid interference between the projection optical system (PL) and the illumination optical system (IL), it is necessary to design the projection optical system (PL) to have an aperture stop in a rear portion thereof, or to use a D-shaped lens element. However, as shown at (B) in FIG. 16, using a D-shaped lens element makes it difficult to obtain a uniform distribution of brightness.

FIGS. 17 and 18 show a principal portion of a second conventional example. FIG. 17 shows the optical path of projection light (i.e. the light to be projected) when the micromirrors of a DMD (2) are in an ON state, and FIG. 18 shows the optical path of projection light when the micromirrors of a DMD (2) are in an OFF state. This projection optical apparatus is provided with a TIR (total internal reflection) prism (PR) composed of a first prism (PR1) and a second prism (PR2), and with a projection optical system (PL) having an optical axis AX. Here, if the mirror rotation angles of the DMD (2) (i.e. the rotation angles of the micromirrors constituting the DMD (2)) are ± 10°, using a TIR prism (PR) makes it possible to obtain the maximum f/number of f/3.0 in a completely telecentric construction. This makes it possible to make efficient use of light and thereby obtain satisfactory brightness in projected images.

However, in a projection optical apparatus of a one-chip type like this second conventional example, where the distance from the DMD (2) to the projection optical system (PL) is short, as shown in FIG. 18, of the light reflected by OFF-state micromirrors, portions traveling close to the projection optical system (PL) and portions internally reflected from a side surface of the second prism (PR2) enter the projection optical system (PL). These portions of reflected light act as ghost light and thereby degrade contrast. Moreover, a construction telecentric toward the DMD (2) requires that, in a telecentric-side portion thereof, rays pass through a positive lens element at comparatively great heights. This makes it difficult to reduce lateral chromatic aberration.

FIGS. 19 and 20 show a principal portion of a third conventional example. FIG. 19 shows the optical path of projection light when the micromirrors of a DMD (2) are in an ON state, and FIG. 20 shows the optical path of projection light when the micromirrors of a DMD (2) are in an OFF state. In this third conventional example, as compared to the second conventional example, a longer back-focal length is secured in the projection optical system (PL). This makes it possible to prevent those portions of the light reflected by OFF-state micromirrors which travel close to the projection optical system (PL) from entering the projection optical system (PL). However, this requires that the projection optical system (PL) be made larger and thus makes it difficult to make the projection optical system (PL) satisfactorily inexpensive, and in addition degrades lateral chromatic aberration.

As described above, in the second conventional example, part of the light reflected by OFF-state micromirrors enters the projection optical system (PL), and this degrades contrast. On the other hand, in the third conventional example, it is inevitable to make the projection optical system (PL) larger, and also it is difficult to correct aberrations. To solve these problems, U.S. Pat. No. 5,633,755 proposes a video projector that is so constructed that the light reflected by micromirrors is directed back to the source of the light. However, even in this construction, part of the constituent optical components are shared between an illumination optical system and a projection optical system, and thus degradation of contrast is inevitable owing to interfacial ghosts appearing in those shared components.

In a projection optical apparatus, not only is it necessary to solve problems as mentioned above, but it is also necessary, when the projection optical apparatus is applied to a digital television monitor or printer, to meet high standards in terms of optical performance. For example, a projection optical apparatus for use in a printer is required to offer satisfactory uniformity (several percent or less difference in brightness between axial and off-axial rays) and symmetry of brightness distribution, achieve satisfactory correction of lateral chromatic aberration (0.2 pixel or less in the most off-axial rays) and distortion (0.05% or less) occurring in a projection optical system (PL), and offer satisfactory compactness. On the other hand, a projection optical apparatus for use in a digital television monitor is required to offer satisfactorily high contrast, be provided with a satisfactorily compact and inexpensive projection optical system (PL), and achieve satisfactory correction of lateral chromatic aberration.

SUMMARY OF THE INVENTION

An object of the present invention is to provide a high-performance projection optical apparatus that offers high contrast in projected images.

To achieve the above object, according to the present invention, a projection optical apparatus is provided with: a light source for emitting light; an illumination optical system for emitting as illumination light the light radiated from the light source; a digital micromirror device, having a plurality of micromirrors, for separating the illumination light into signal light and unnecessary light by varying, in accordance with a signal, the angles at which the individual micromirrors reflect the illumination light shone thereon; a total internal reflection prism composed of a first prism for totally reflecting and thereby directing the illumination light exiting from the illumination optical system to the digital micromirror device and a second prism for transmitting the signal light reflected from the digital micromirror device; and a projection optical system for projecting the signal light transmitted through the second prism onto a projection surface. Here, the following condition is fulfilled:

$$L/[\tan\{\theta_D - \sin^{-1}(1/(2 \cdot Fa))\}] \leq xa \leq L/\tan(\theta_D - 0.87\,\theta_D)$$

where Fa represents the f/number of the illumination optical system on the digital micromirror device side thereof, which falls within a range $1/\{2 \sin (0.85\,\theta_D)\} \leq Fa \leq 1/\{2 \sin (0.3\,\theta_D)\}$; xa represents the distance from the digital micromirror device to the digital micromirror device side pupil of the illumination optical system; L represents the distance from the optical axis position of the digital micromirror device to the most off-axial position thereof; and $\theta_D$ represents the rotation angle of the micromirrors constituting the digital micromirror device.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Hereinafter, projection optical apparatuses embodying the present invention will be described with reference to the drawings. It is to be noted that, in the following descriptions, such elements as find their counterparts (i.e. elements serving the same or corresponding functions) in the conventional examples described earlier (FIGS. 16 to 20) or between different embodiments of the invention are identified with the same reference symbols, and overlapping explanations will be omitted.

Figure 3:
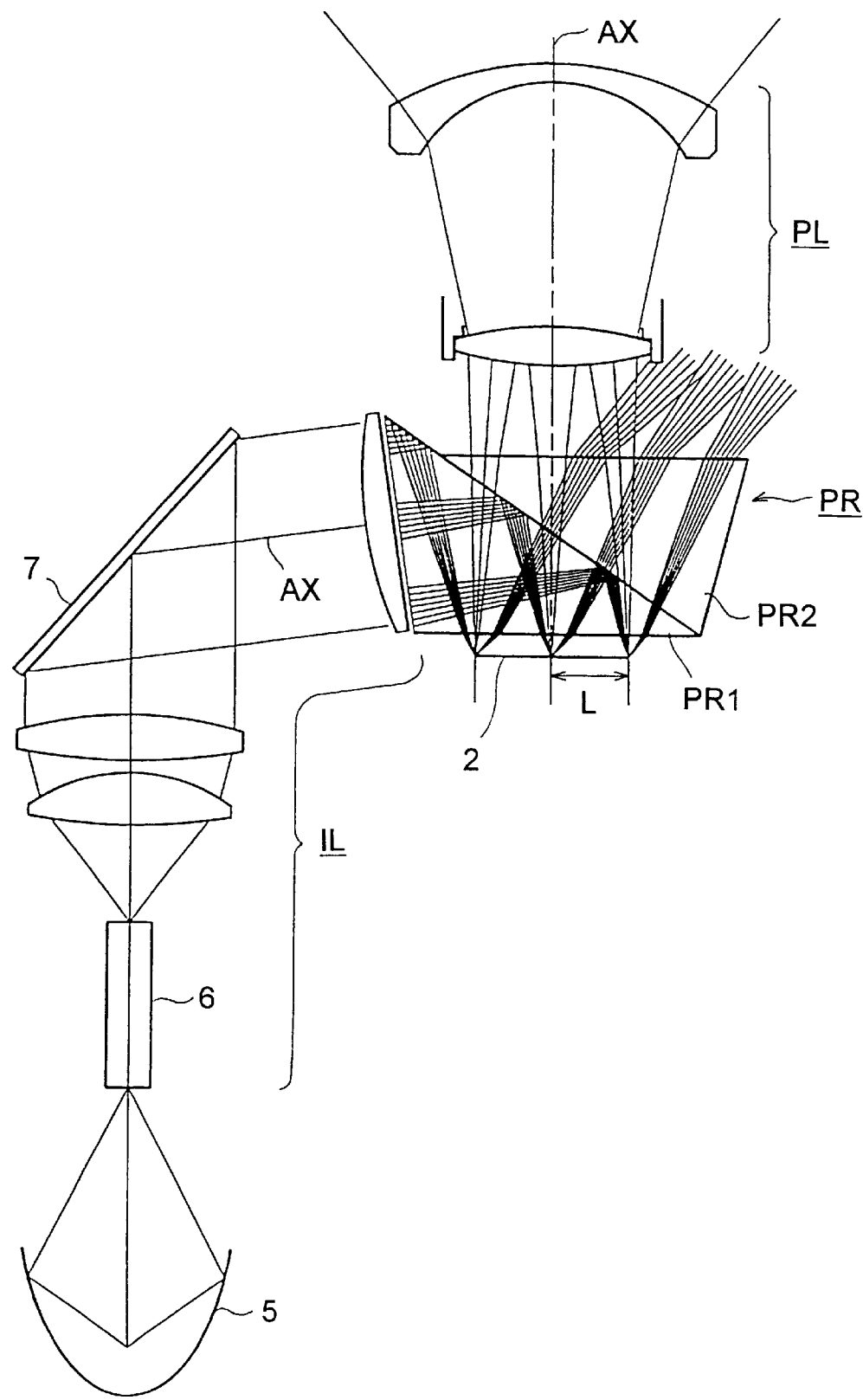
FIG. 3 is an optical construction diagram of a first embodiment of the invention.
Figure 4:
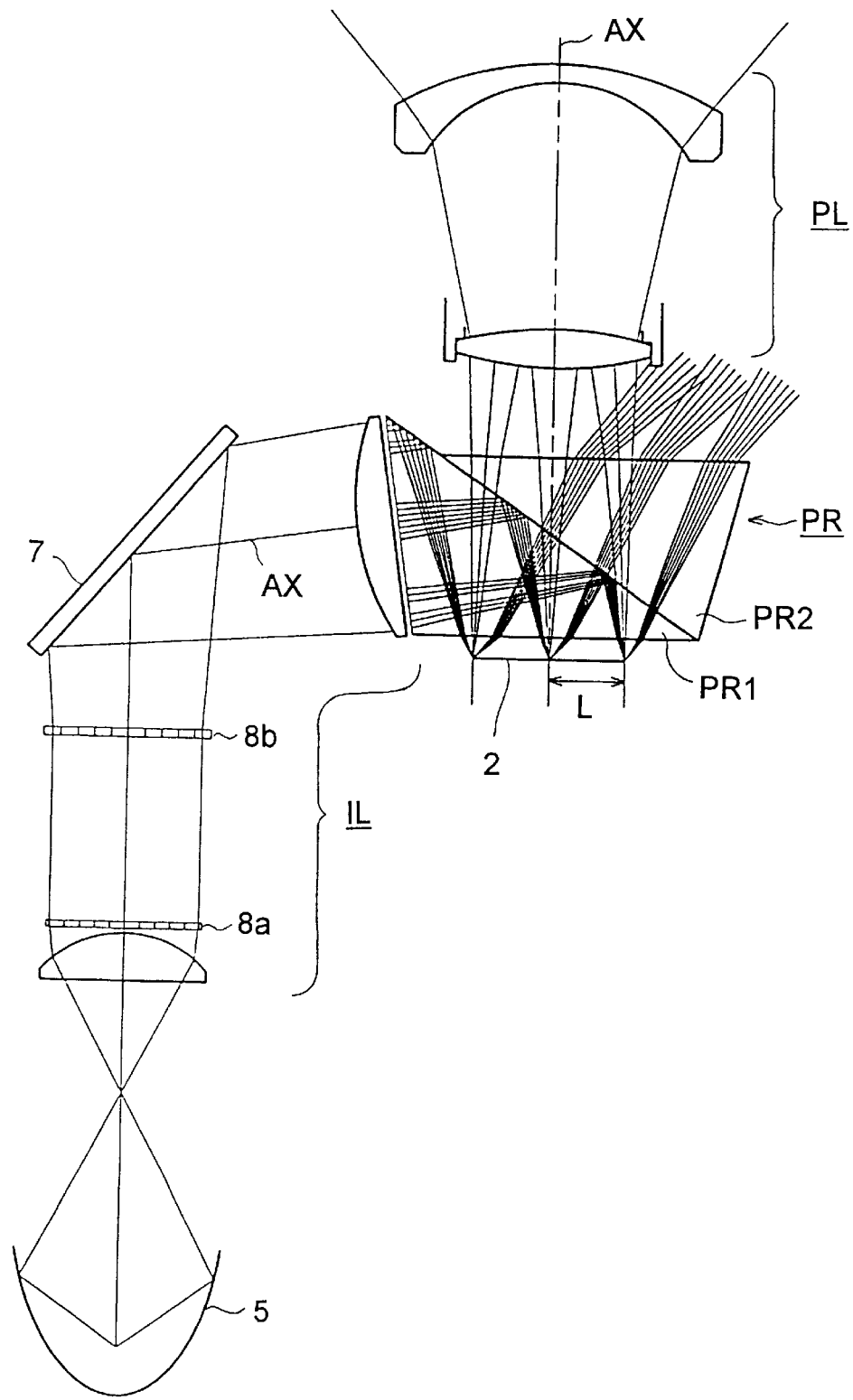
FIG. 4 is an optical construction diagram of a second embodiment of the invention.
Figure 5:
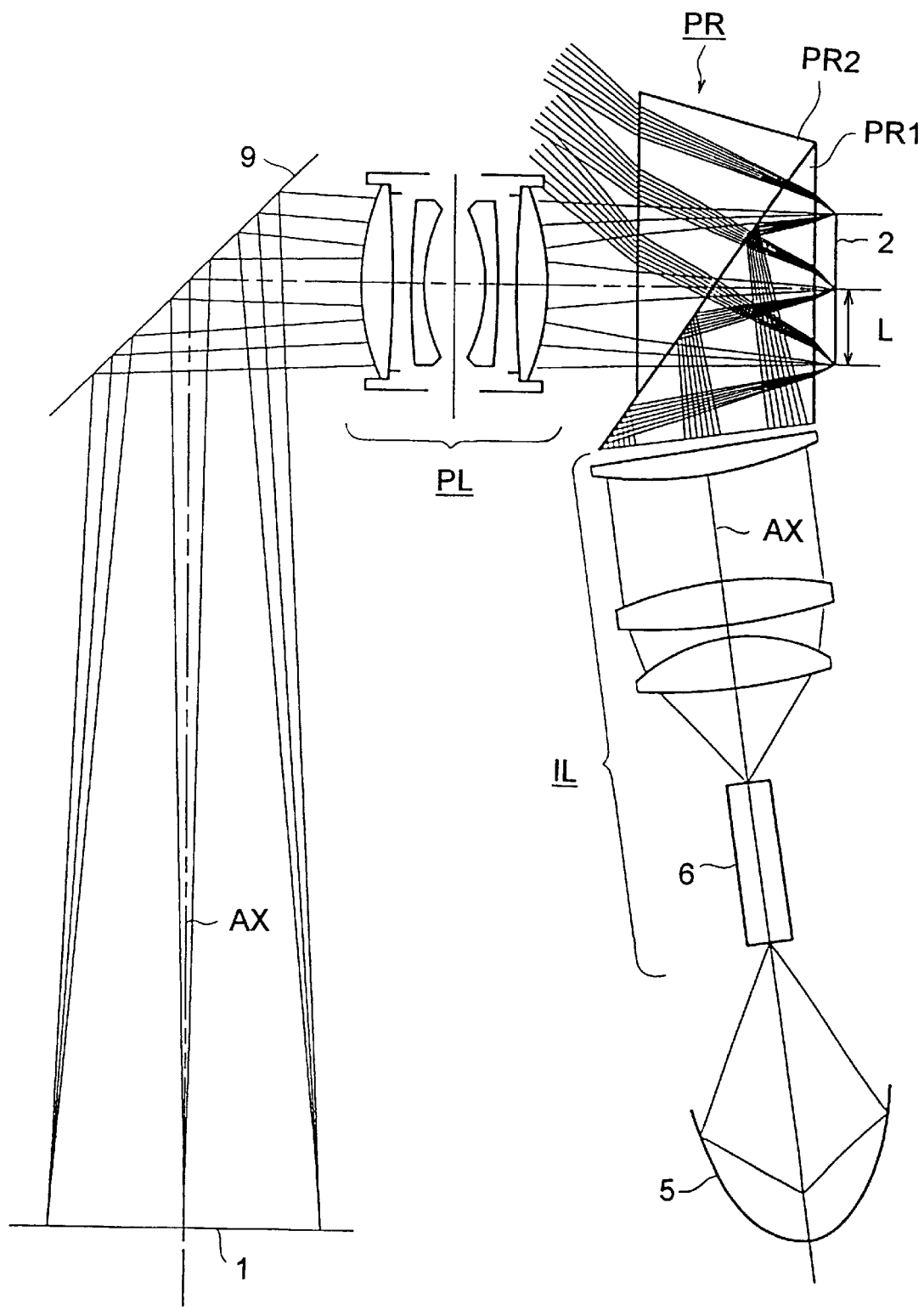
FIG. 5 is an optical construction diagram of a third embodiment of the invention.

FIGS. 3 to 5 show the optical construction of a first, a second, and a third embodiment, respectively, of the invention. The first to third embodiments are all projection optical apparatuses each provided with a light source (5), an illumination optical system (IL), a TIR prism (PR), a DMD (2), and a projection optical system (PL) and having an optical axis AX. Of these embodiments, the first and second embodiments are projection optical apparatuses for use in digital television monitors, and the third embodiment is a projection optical apparatus for use in a printer. In these embodiments, projection of color images can be achieved by disposing a rotatable color wheel (not shown) in the optical path. For example, a color wheel composed of a plurality of color filters that transmit or reflect different colors (R, G, and B) is rotated in the optical path so that light of one color after another is projected sequentially.

In all of these embodiments, the light source (5) is composed of a lamp, a reflector, and others, and the light radiated from the light source (5) is directed through the illumination optical system (IL) to the TIR prism (PR). The illumination optical system (IL) is composed of a plurality of lens elements or the like (and also a turning mirror 7 in FIGS. 3 and 4), and is also given a function of smoothing the light from the light source (5). Smoothing illumination light makes it possible to minimize the difference in brightness between axial and off-axial rays on the display surface of the DMD (2) (i.e. it is possible to make brightness distribution uniform). This smoothing of illumination light is achieved by an integrator rod (6) in the first and third embodiments, and by a first lens array (8a) and a second lens array (8b) in the second embodiment.

The TIR prism (PR) is composed of a first prism (PR1) and a second prism (PR2), and serves to separate the light traveling toward the DMD (2) and the light traveling off the DMD (2). The first prism (PR1) totally reflects the light exiting from the illumination optical system (IL). The light totally reflected by the first prism (PR1) illuminates the DMD (2) and is modulated by being reflected thereby. The second prism (PR2) transmits the light having been modulated by the DMD (2) and then transmitted through the first prism (PR1).

The light thus modulated by the DMD (2) and transmitted through the TIR prism (PR) is then projected through the projection optical system (PL) composed of a plurality of lens elements or the like (only partially shown in the figure) onto a projection surface (1, although not shown in FIGS. 3 and 4). In FIG. 5, there is also provided a turning mirror 9. Here, it is to be noted that only those portions of the light that have been reflected by ON-state micromirrors (M), described later, are permitted to travel through the projection optical system (PL) so as to be projected. In the first and second embodiments, the projection surface (not shown) corresponds to a screen surface; in the third embodiment, the projection surface (1) corresponds to a photosensitive surface of a photoconductive drum or sheet of photosensitive paper.

Figure 1:
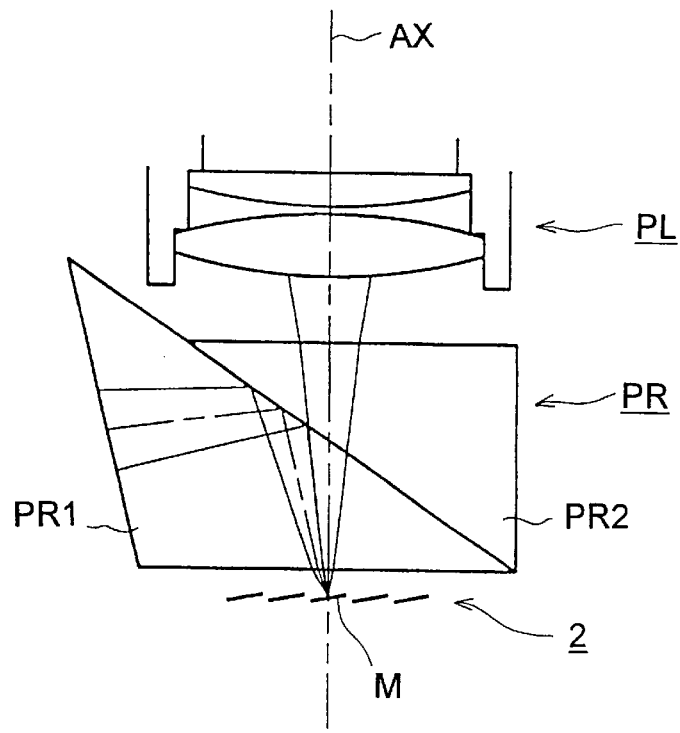
FIG. 1 is an optical construction diagram showing the optical path observed when the micromirrors of the DMD are in an ON state in a projection optical apparatus according to the invention.
Figure 2:
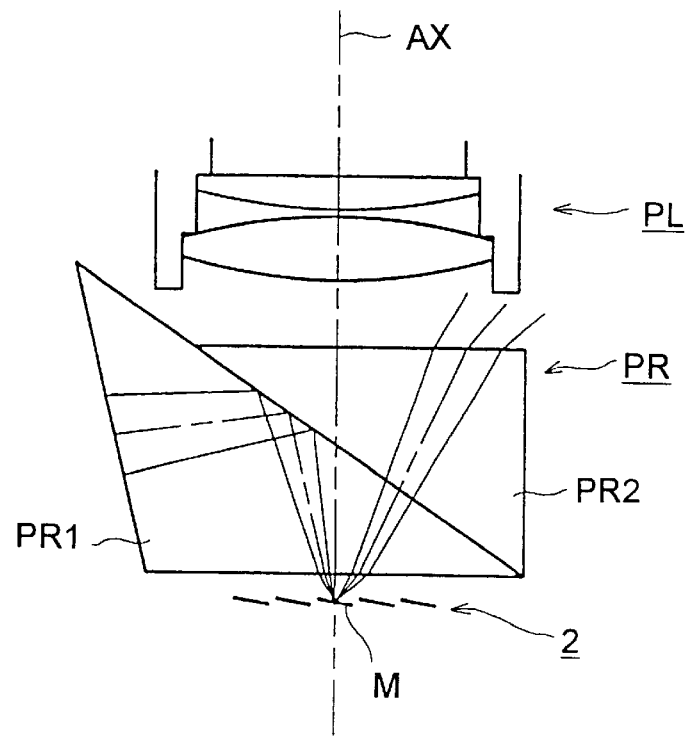
FIG. 2 is an optical construction diagram showing the optical path observed when the micromirrors of the DMD are in an OFF state in a projection optical apparatus according to the invention.

Now, how the DMD (2) modulates light will be described in more detail. FIG. 1 shows the optical path observed when the micromirrors (M) of the DMD (2) are in an ON state, and FIG. 2 shows the optical path observed when the micromirrors (M) of the DMD (2) are in an OFF state. The DMD (2) has a display surface having a large number of micromirrors (M) arranged in a matrix, and each micromirror (M) constitutes one pixel (for example, having a pitch of 16 μm) of a displayed image. To achieve light modulation, the inclination of the individual micromirrors (M) is driven and controlled independently (for example, either of mirror rotation angles of ±10°) so that each micromirror (M) is in one of two differently inclined states at a time, namely either in an ON state (FIG. 1) or in an OFF state (FIG. 2).

Micromirrors (M) in their ON state reflect illumination light toward the inside of the projection optical system (PL) (light reflected in this way will be referred to also as "ON light"), and micromirrors (M) in their OFF state reflect illumination light toward the outside of the projection optical system (PL) (light reflected in this way will be referred to also as "OFF light"). Thus, only those portions of illumination light that have been reflected by micromirrors (M) in their ON state travel through the projection optical system (PL) to reach the projection surface, thereby forming a displayed image, which is a pattern consisting of differently bright spots, on the projection surface.

OFF light is unnecessary for image formation on the projection surface, and letting OFF light enter the projection optical system (PL) degrades contrast, as described earlier. In all of the embodiments, light is transmitted in a non-telecentric state between the illumination optical system (IL) and the projection optical system (PL). This prevents OFF light (in particular, those portions thereof that travel close to the projection optical system (PL)) from entering the projection optical system (PL), and also alleviates the burden on the projection optical system (PL) in terms of aberration correction. To permit light to be transmitted in a non-telecentric state between the illumination optical system (IL) and the projection optical system (PL), it is necessary to define the DMD (2) side f/number and DMD (2) side pupil position of those optical systems in the manner described below.

If it is assumed that the angle of incidence of principal rays incident on the pupil is θ, within a range in which the optical system has the brightest f/number of $\{1/(2 \sin \theta)\}$, it is possible to separate the light traveling toward the DMD and the light traveling off the DMD. Accordingly, within this range, the f/number is made as dark as possible to obtain a construction as non-telecentric as possible so that the pupil can be located as close as possible to the DMD. Suppose that the distance (the maximum image height) from the optical axis position of the DMD (i.e. the center of the display surface thereof) to the most off-axial position thereof is L, the f/number of the optical system is F, the rotation angles of the micromirrors of the DMD are $\pm\theta_D$, the maximum transmission angle (the greatest possible transmission angle that permits separation of the light traveling toward and off the DMD) of the TIR prism as converted for air is γ (here, $\gamma \approx \theta_D$ and γ is not greater than $\theta_D$) (in this case, rays having the maximum f/number of F=1/(2 sin θ), in a telecentric state, are considered), and the DMD side ray angle (the angle relative to principal rays) of the optical system is α. Then, the distance (pupil position) x from the DMD to the pupil is given by formula (i) below, and the angle of incidence θ is given by formula (ii) below.

$$x = L/\tan \theta \qquad (i)$$

$$\theta = \gamma - \alpha = \theta_D - \sin^{-1}\{1/(2 \cdot F)\} \qquad (ii)$$

On the basis of formulae (i) and (ii), the lower limit of the pupil position x is set as given by formula (iii) below. If it is assumed that the optical system has the brightest f/number of $F=1/\{2 \sin (0.85 \theta_D)\}$, then $\theta=(1-0.85)\theta_D$, and therefore θ is set at a value smaller than this value, namely $\theta=(1-0.87)\theta_D$. On the basis of this upper limit of the pupil position x and the lower limit of formula (iii), the range of the pupil position x is defined by formula (iv) below.

$$x = L/[\tan\{\theta_D - \sin^{-1}(1/(2 \cdot F))\}] \qquad (iii)$$

$$L/[\tan\{\theta_D - \sin^{-1}(1/(2 \cdot F))\}] \leq x \leq L/\tan(\theta_D - 0.87 \theta_D) \qquad (iv)$$

From the perspective described above, if it is assumed that the DMD (2) side f/number of the illumination optical system (IL) is Fa, for Fa within the range $1/\{2 \sin (0.85 \theta_D)\} \leq Fa \leq 1/\{2 \sin (0.3 \theta_D)\}$, it is preferable that the following condition (I) be fulfilled:

$$L/[\tan\{\theta_D - \sin^{-1}(1/(2 \cdot Fa))\}] \leq xa \leq L/\tan(\theta_D - 0.87 \theta_D) \qquad (I)$$

where
- xa represents the distance from the DMD (2) to the DMD (2) side pupil of the illumination optical system (IL);
- L represents the distance from the optical axis (AX) position of the DMD (2) to the most off-axial position thereof; and
- $\theta_D$ represents the mirror rotation angle of the DMD (2) (i.e. the rotation angle of the micromirrors (M) thereof).

If the upper limit of condition (I) is transgressed, the angles of principal rays on the DMD (2) side of the illumination optical system (IL) become more telecentric (i.e. the distance from the pupil to the DMD (2) becomes closer to infinity). This makes it difficult to separate ON and OFF light within the TIR prism (PR), and thus causes OFF light to enter the projection optical system (PL), degrading contrast. If the lower limit of condition (I) is transgressed, part of the illumination light ceases to fulfill the conditions for total reflection. This reduces the rays that enter the projection optical system (PL) as ON light, and thus makes the projected image dimmer.

On the other hand, if it is assumed that the DMD (2) side f/number of the projection optical system (PL) is Fb, for Fb within the range $1/\{2 \sin (0.85\ \theta_D)\} \leq Fb \leq 1/\{2 \sin (0.3\ \theta_D)\}$, it is preferable that the following condition (II) be additionally fulfilled:

$$L/[\tan\{\theta_D - \sin^{-1}(1/(2 \cdot Fb))\}] \leq xb \leq L/\tan(\theta_D - 0.87\ \theta_D) \quad \text{(II)}$$

where
- xb represents the distance from the DMD (2) to the DMD (2) side pupil of the projection optical system (PL).

If the upper limit of condition (II) is transgressed, the angles of principal rays on the DMD (2) side of the projection optical system (PL) become more telecentric (i.e. the distance from the pupil to the DMD (2) becomes closer to infinity). This causes rays to travel unduly wide apart from the optical axis (AX) when they pass through the last surface of the projection optical system (PL), and thus makes it difficult to correct, in particular, lateral chromatic aberration and distortion. Moreover, this requires that the projection optical system (PL) be made unduly large. If the lower limit of condition (II) is transgressed, part of the rays used in the projection optical system (PL) cease to fulfill the conditions for total reflection. This reduces the rays that enter the projection optical system (PL) as ON light, and thus makes the projected image dimmer.

In a projection optical apparatus, like those of the first to third embodiments, that employs a TIR prism (PR) and a DMD (2), making the DMD (2) side f/number of the illumination optical system (IL) greater (darker) and locating the exit pupil closer so as to obtain a less telecentric construction makes it easier to separate ON and OFF light and thereby alleviate degradation of contrast attributable to OFF light (unnecessary light). This helps greatly improve contrast, which is an important factor in television monitors, and therefore, by applying the projection optical apparatuses of the first and second embodiments to digital television monitors, it is possible to obtain high image quality in projected images.

Moreover, the projection optical system (PL), when designed to match the pupil position and f/number of the illumination optical system (IL), offers a large f/number, and can thus be made inexpensive and compact. In addition, since the construction thus obtained is sufficiently non-telecentric, off-axial rays pass through a positive lens disposed close to the DMD (2) at moderate heights. This helps reduce lateral chromatic aberration and thereby achieve higher optical performance. In particular, within the ranges of angles of view and pupil positions in which an optical system of a nearly symmetric type, such as of a Gauss type, can be used as the projection optical system (PL), it is possible to reduce lateral chromatic aberration and distortion to almost zero. Thus, it is possible to realize a projection optical apparatus, like that of the third embodiment, that is best suited for use in printers. Here, ease of aberration correction makes it possible to use inexpensive materials and thereby effectively achieve cost reduction, which is an important factor in consumer products.

Figure 6:
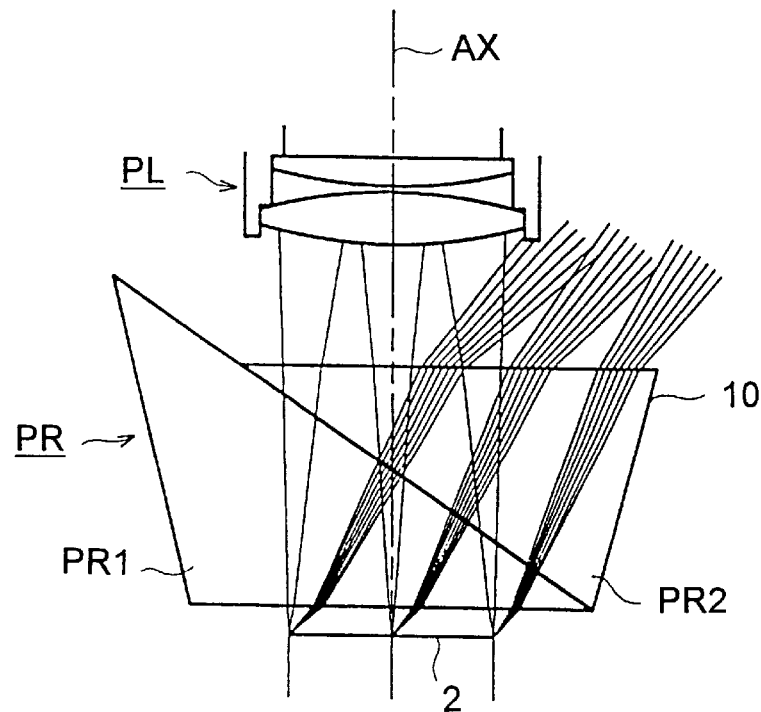
FIG. 6 is an optical construction diagram illustrating the action of an example of the TIR prism used in the first to third embodiments.

In all of the embodiments, as shown in FIG. 6, the second prism (PR2) of the TIR prism (PR) is so shaped that the light reflected from the DMD (2) is not internally reflected; specifically, the second prism (PR2) is given a triangular shape such that it protrudes in a direction perpendicular to the optical axis (AX) at its side facing the projection optical system (PL). In the conventional examples described earlier (FIGS. 17 to 20), the side surface of the second prism (PR2) is parallel to the optical axis (AX), and thus those portions of OFF light that have internally reflected from that side surface enter the projection optical system (PL). By contrast, by giving the side surface (10) of the second prism (PR2) an inclination as shown in FIG. 6, it is possible to prevent OFF light from striking the side surface (10) and thereby prevent OFF light from being internally reflected so as to enter the projection optical system (PL). This makes it possible to prevent degradation of contrast resulting from internal reflection of OFF light.

Figure 7:
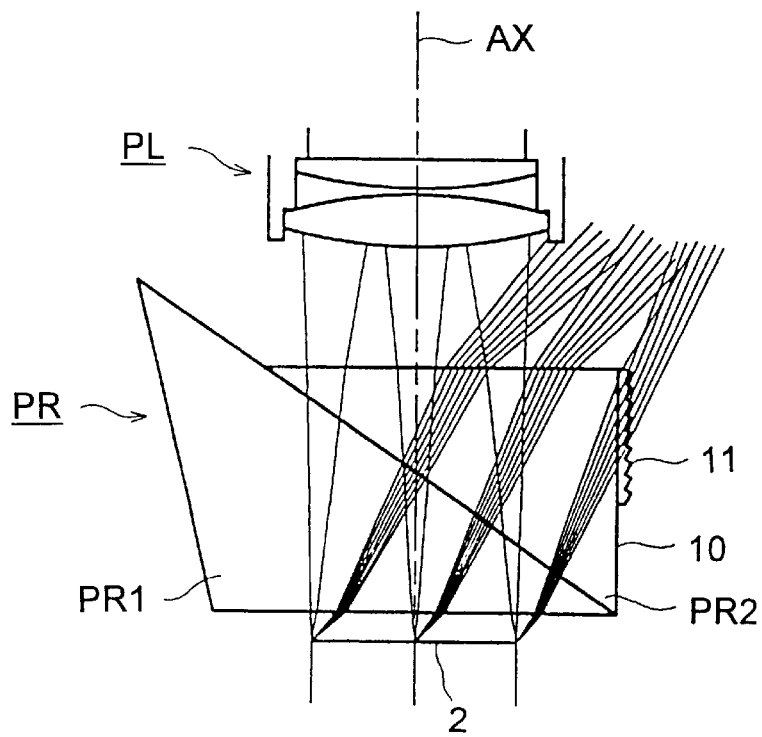
FIG. 7 is an optical construction diagram illustrating the action of another example of the TIR prism used in the first to third embodiments.

Instead of giving the side surface (10) of the second prism (PR2) an inclination, it is also possible, as shown in FIG. 7, to cement a sheet (11) having a sawtooth-shaped section (like that of a Fresnel lens) on the side surface (10) that the OFF light reflected from the DMD (2) strikes. By cementing a sheet (11) having a sawtooth-shaped section on the side surface (10) that OFF light strikes from within the second prism (PR2), it is possible to make OFF light pass through the surface (10) and then through the sheet (11). This prevents OFF light from being internally reflected so as to enter the projection optical system (PL). Using the sheet (11) in this way makes it possible not only to prevent degradation of contrast resulting from internal reflection of OFF light, but also to reduce the weight and size of the second prism (PR2).

Moreover, in the third embodiment (FIG. 5), of the lens elements constituting the illumination optical system (IL), the one disposed at the DMD (2) side end is disposed at an angle relative to the optical axis (AX). Disposing the lens element at the DMD (2) side end of the illumination optical system (IL) in this way helps improve the focus condition in the illuminated area. Thus, it is possible to make efficient use of light and thereby obtain satisfactory brightness in projected images.

PRACTICAL EXAMPLES

Figure 8:
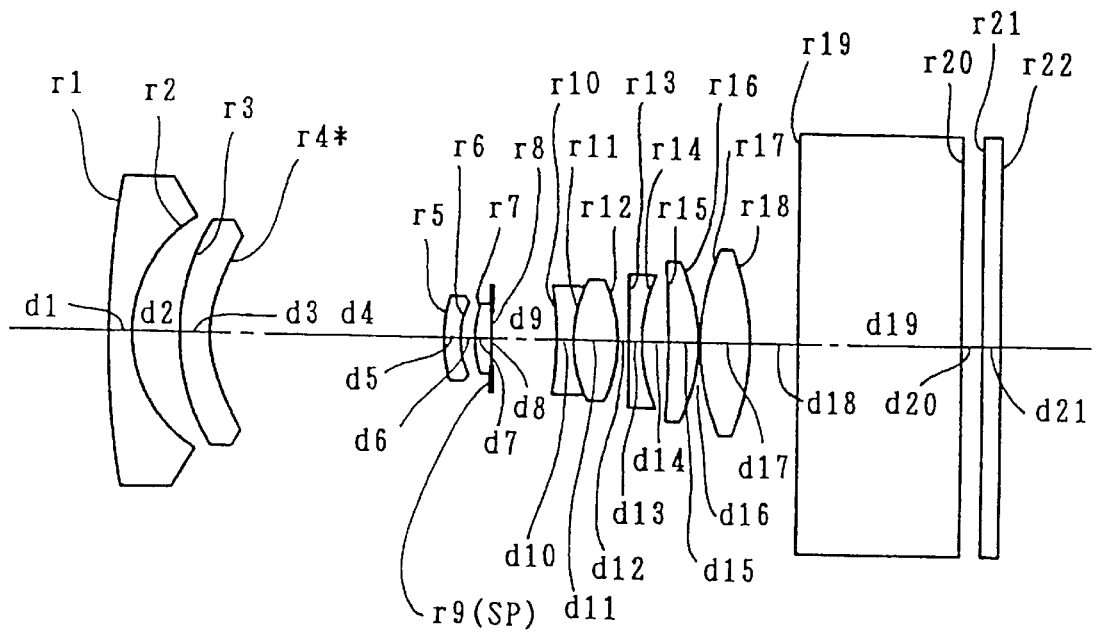
FIG. 8 is a lens construction diagram of the projection optical system of Example 1.
Figure 10:
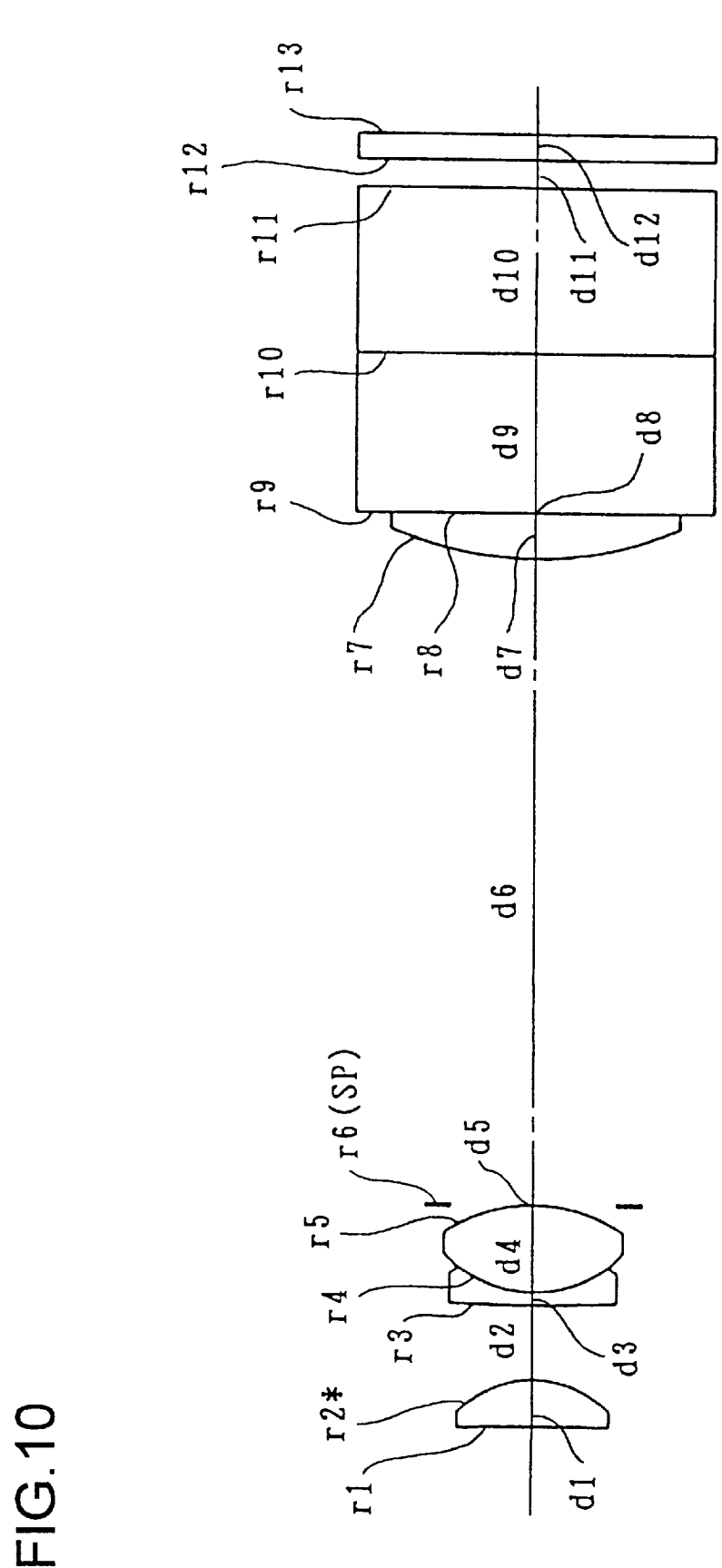
FIG. 10 is a lens construction diagram of the illumination optical system of Example 1.
Figure 12:
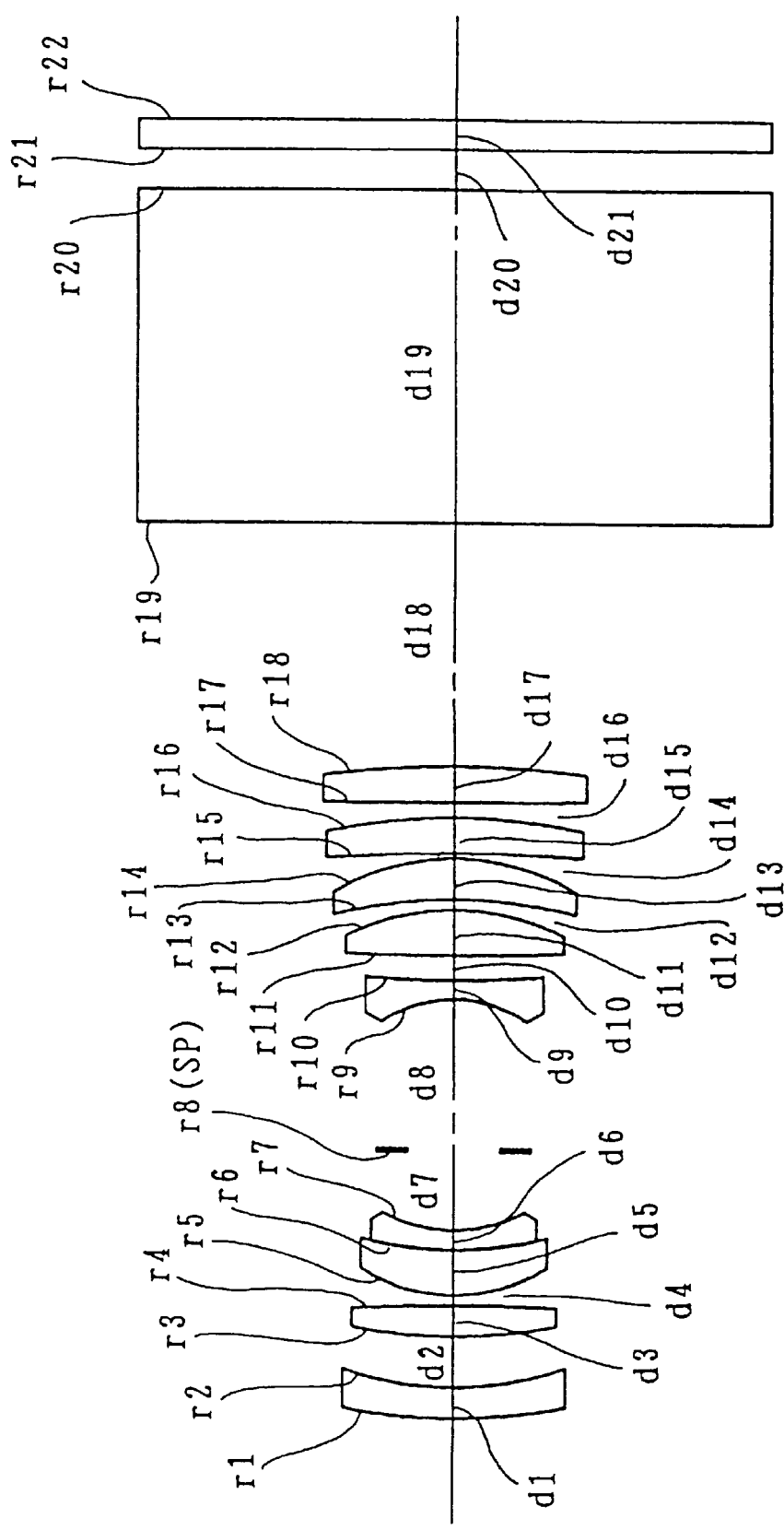
FIG. 12 is a lens construction diagram of the projection optical system of Example 2.
Figure 14:
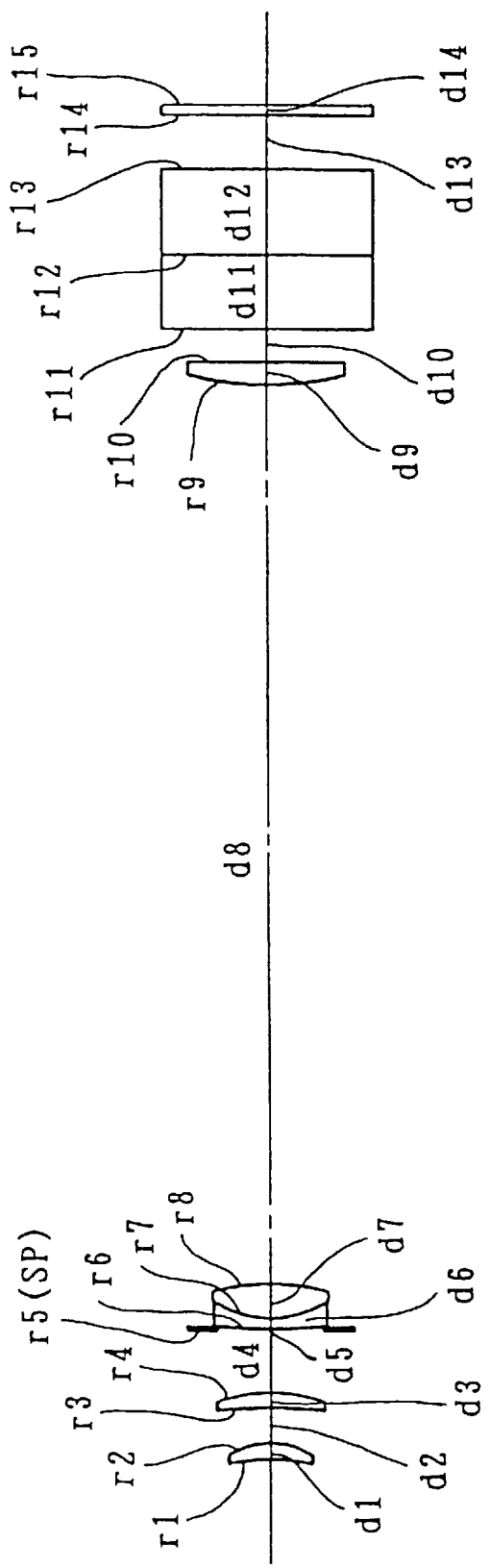
FIG. 14 is a lens construction diagram of the illumination optical system of Example 2.

Now, practical examples of projection optical apparatuses according to the present invention will be described in more detail with reference to the construction data, aberration diagrams, and other data of their optical systems. The optical systems (PL and IL) of Example 1 described below correspond to the projection optical system (PL) and the illumination optical system (IL) constituting the first and second embodiments described above. The optical systems (PL and IL) of Example 2 described below correspond to the projection optical system (PL) and the illumination optical system (IL) constituting the third embodiment described above. FIG. 8 shows the lens construction of the projection optical system (PL) of Example 1, and FIG. 10 shows the lens construction of the illumination optical system (IL) of Example 1. FIG. 12 shows the lens construction of the projection optical system (PL) of Example 2, and FIG. 14 shows the lens construction of the illumination optical system (IL) of Example 2. The flat plate disposed at one end of each optical system (PL or IL) corresponds to the TIR prism (PR) and the cover glass plate of the DMD (2).

Tables 1 and 2 list the construction data of the projection optical system (PL) and the illumination optical system (IL), respectively, of Example 1. Tables 4 and 5 list the construction data of the projection optical system (PL) and the illumination optical system (IL), respectively, of Example 2. In the construction data of each optical system, ri (i=1, 2, 3, . . . ) represents the radius of curvature (mm) of the i-th surface from the projection surface or light source (5) side, di (i=1, 2, 3, . . . ) represents the i-th axial distance (mm) from the projection surface or light source (5) side, and Ni (i=1, 2, 3, . . . ) and vi (i=1, 2, 3, . . . ) respectively represent the refractive index (Nd) for the d line and the Abbe number (vd) of the i-th optical element from the projection surface or light source (5) side. Also listed are the lateral magnification ($\beta$), the object distance (S1), and the effective f/number ($F_{eff}$) of the entire optical system. It is to be noted that, for the projection optical system (PL), the object distance (S1) is the distance from the front-end surface (r1) to the projection surface (a screen surface or photosensitive surface) and, for the illumination optical system (IL), the object distance (S1) is the distance from the front-end surface (r1) to the plane conjugate with the DMD (2) (for example, the end surface of the integrator rod (6)). It is to be noted also that, in both Examples 1 and 2, the mirror rotation angles of the DMD (2) are ±10°.

A surface whose radius of curvature ri is marked with an asterisk (*) is an aspherical surface, of which the surface shape is defined by formula (AS) below. The aspherical surface data of each aspherical surface is listed together with the construction data. Tables 3 and 6 list the actual values of conditions (I) and (II) as observed in Examples 1 and 2, respectively.

$$X(H)=(C \cdot H^2)/\{1+\sqrt{(1-\epsilon \cdot C^2 H^2)}\}+(A4 \cdot H^4+A6 \cdot H^6+A8 \cdot H^8) \quad (AS)$$

where

X(H) represents the displacement along the optical axis at the height H (with respect to the vertex of the surface);

H represents the height in a direction perpendicular to the optical axis;

C represents the paraxial curvature;

$\epsilon$ represents the quadric surface parameter; and

Figure 9A:
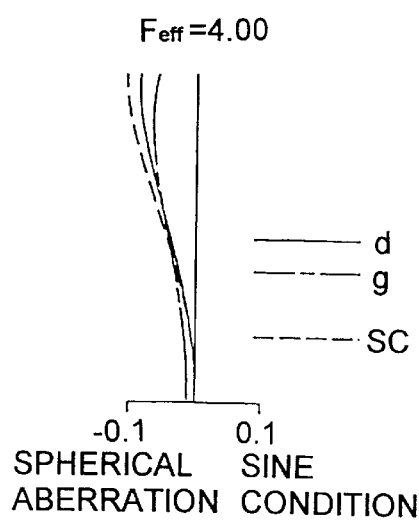
FIGS. 9A to 9C are diagrams showing the aberrations occurring in the projection optical system of Example 1.
Figure 9B:
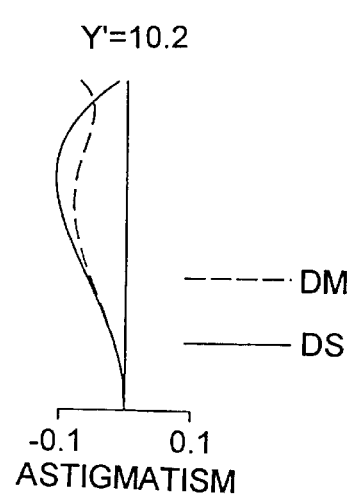
Figure 9C:
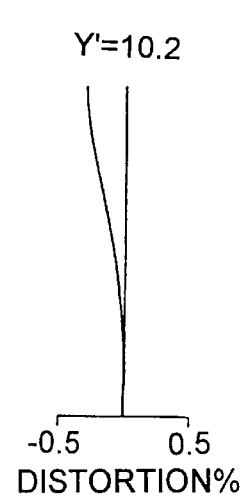
Figures 11A, 11B:
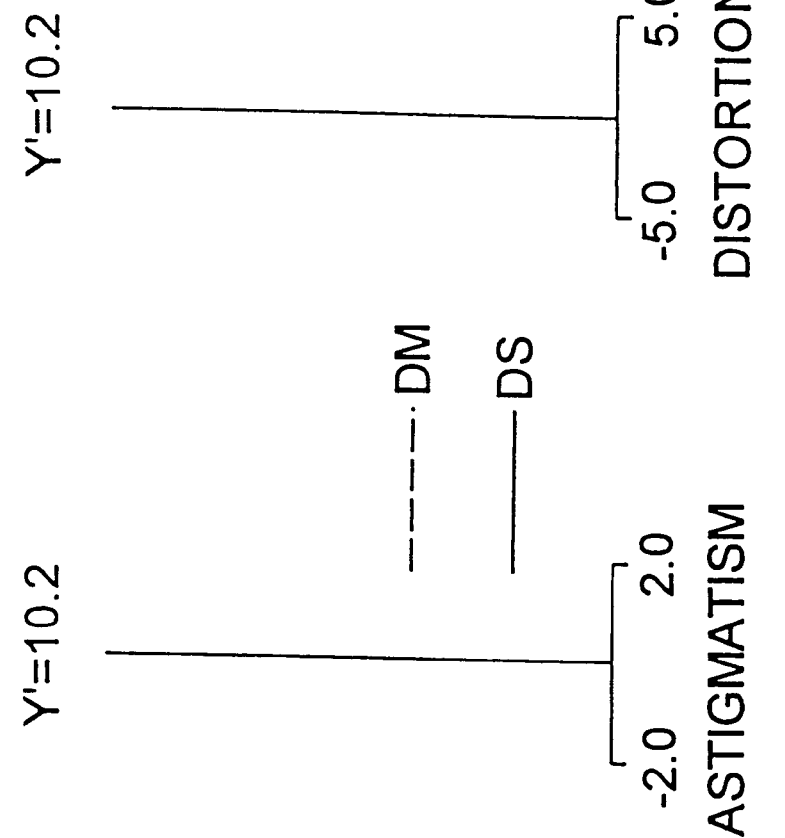
FIGS. 11A to 11C are diagrams showing the aberrations occurring in the illumination optical system of Example 1.
Figure 11C:
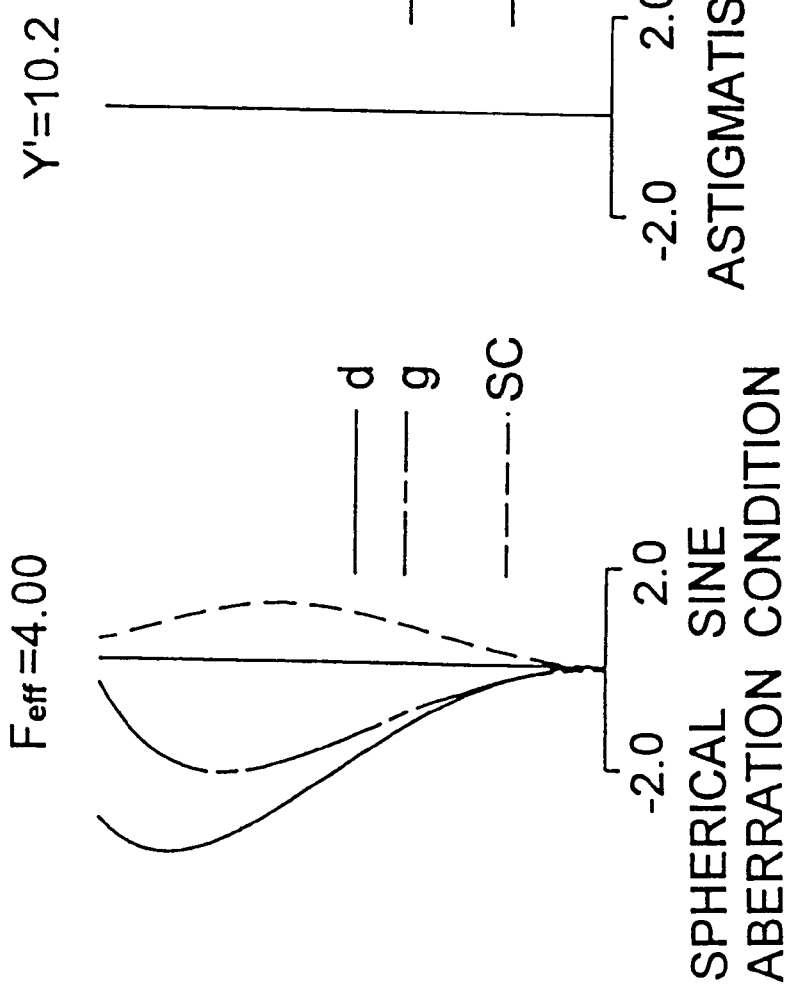
Figure 13:
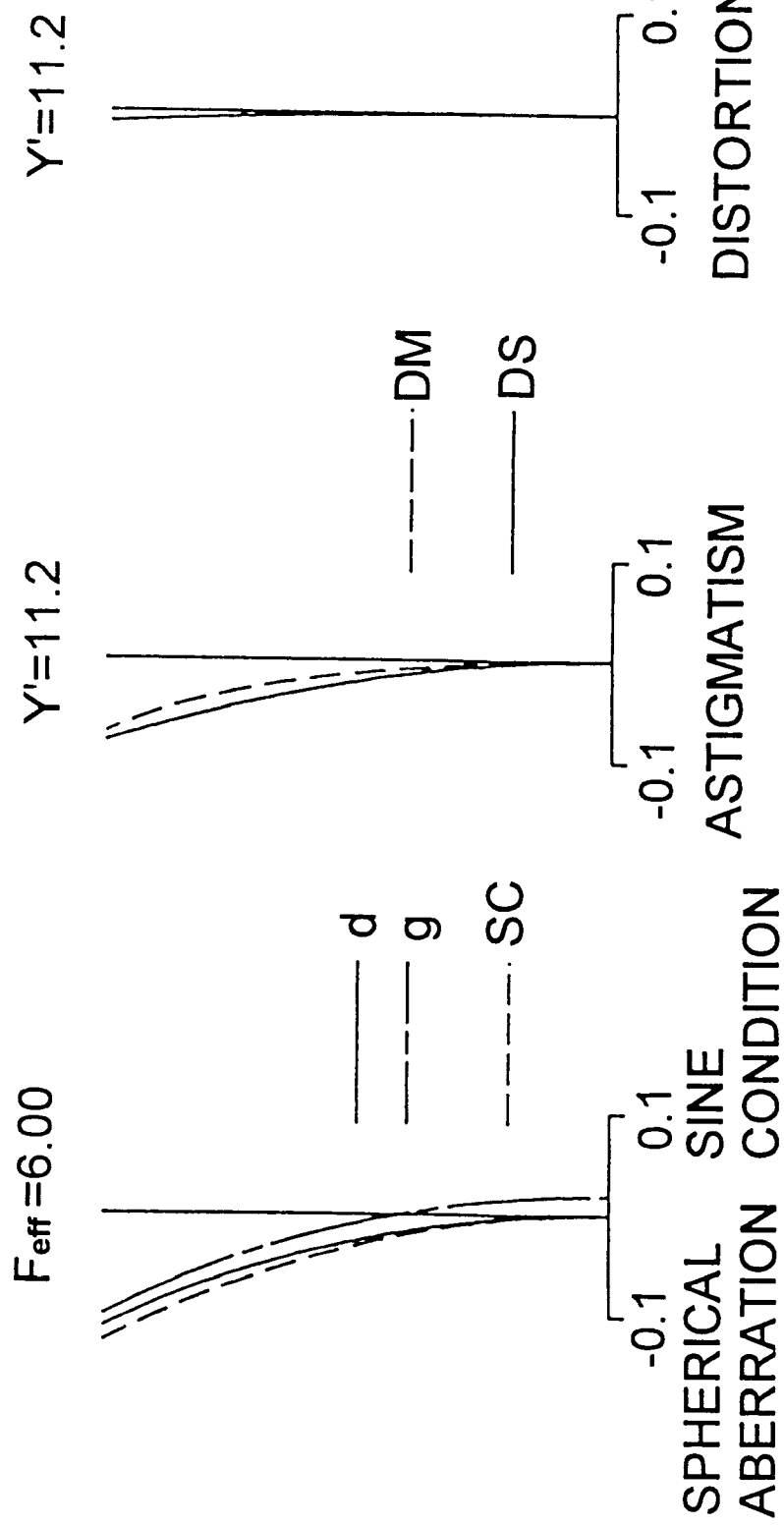
FIGS. 13A to 13C are diagrams showing the aberrations occurring in the projection optical system of Example 2.
Figure 15:
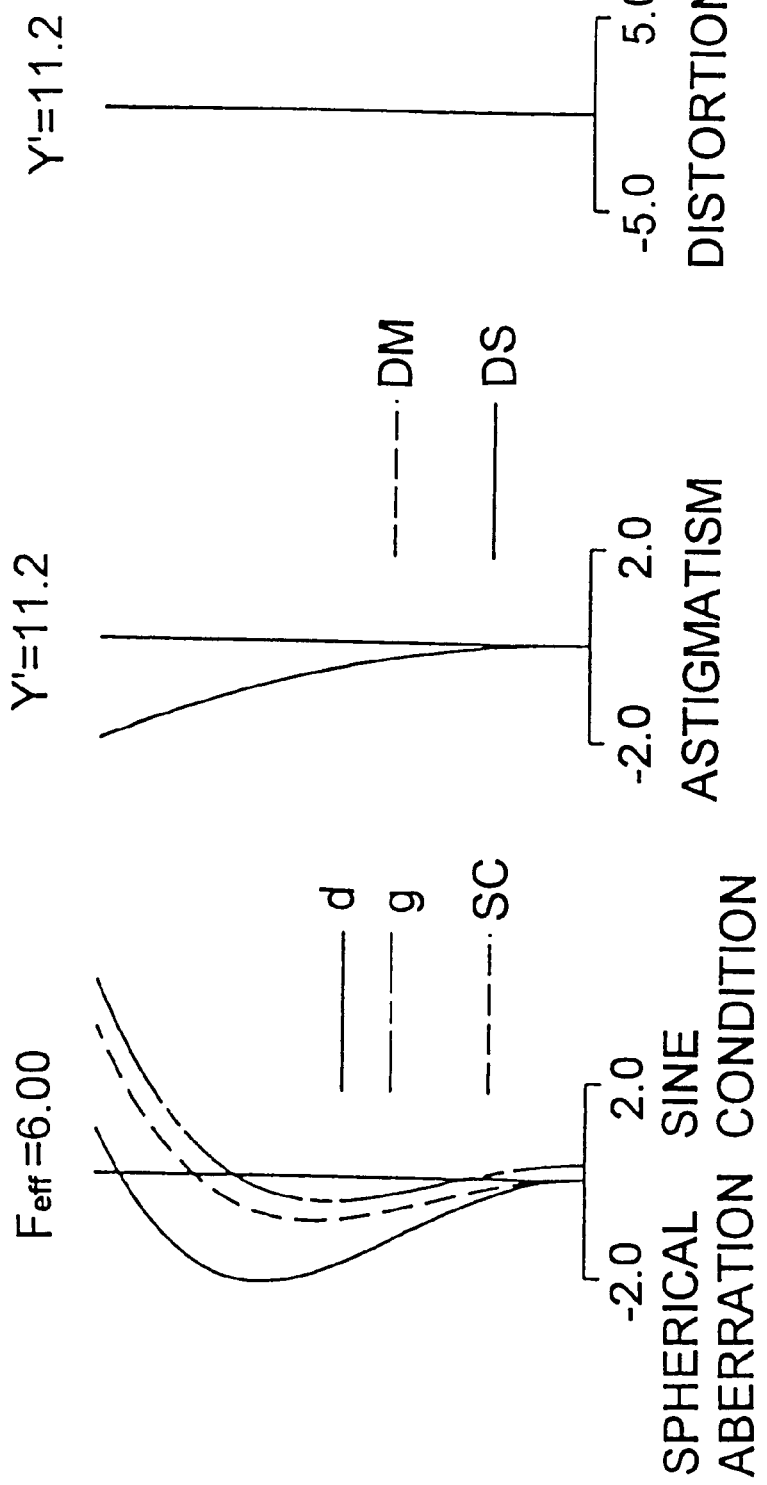
FIGS. 15A to 15C are diagrams showing the aberrations occurring in the illumination optical system of Example 2.
Figure 16:
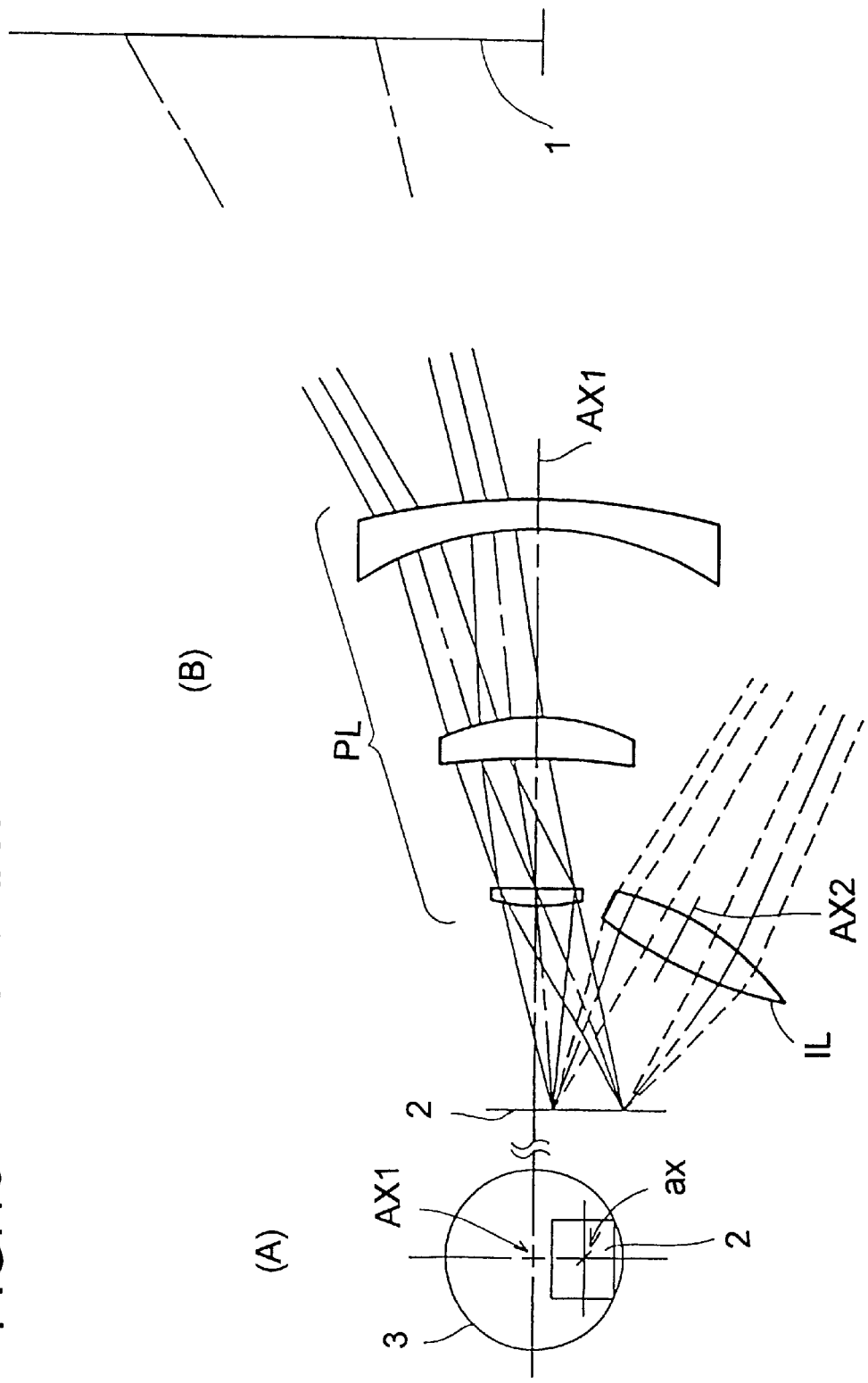
FIG. 16 is an optical construction diagram of a first conventional example.
Figure 17:
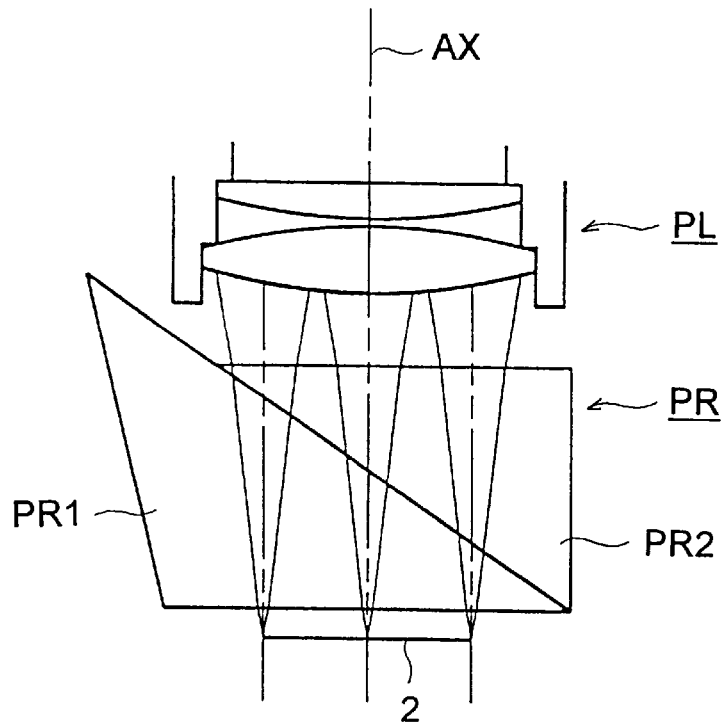
FIG. 17 is an optical construction diagram showing the optical path observed when the micromirrors of the DMD are in an ON state in a second conventional example.
Figure 18:
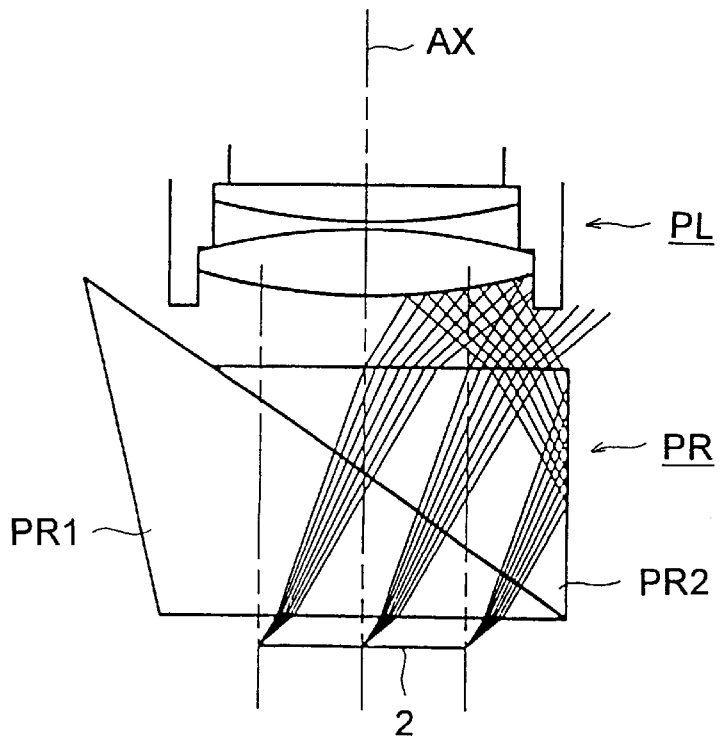
FIG. 18 is an optical construction diagram showing the optical path observed when the micromirrors of the DMD are in an OFF state in the second conventional example.
Figure 19:
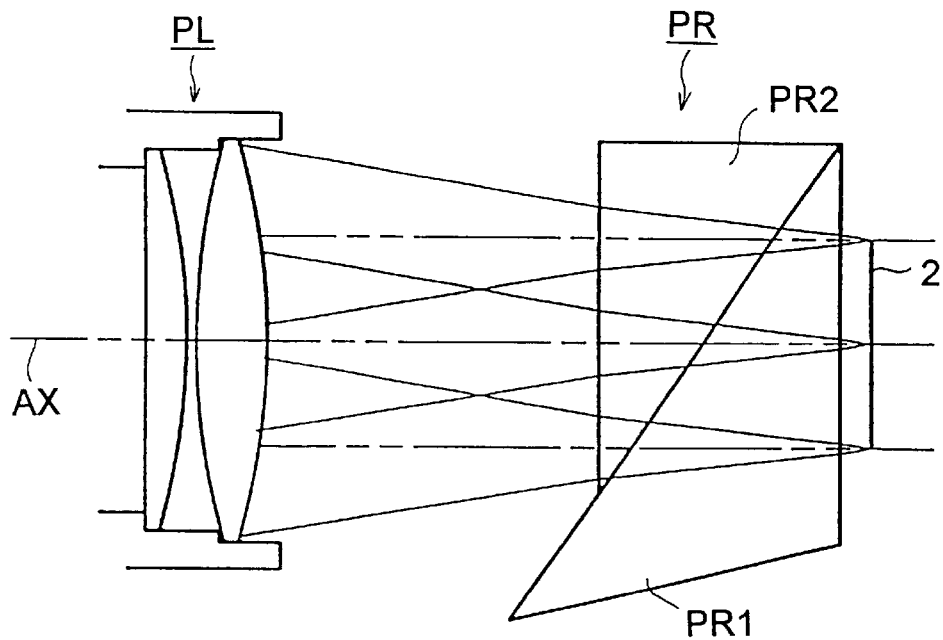
FIG. 19 is an optical construction diagram showing the optical path observed when the micromirrors of the DMD are in an ON state in a third conventional example.
Figure 20:
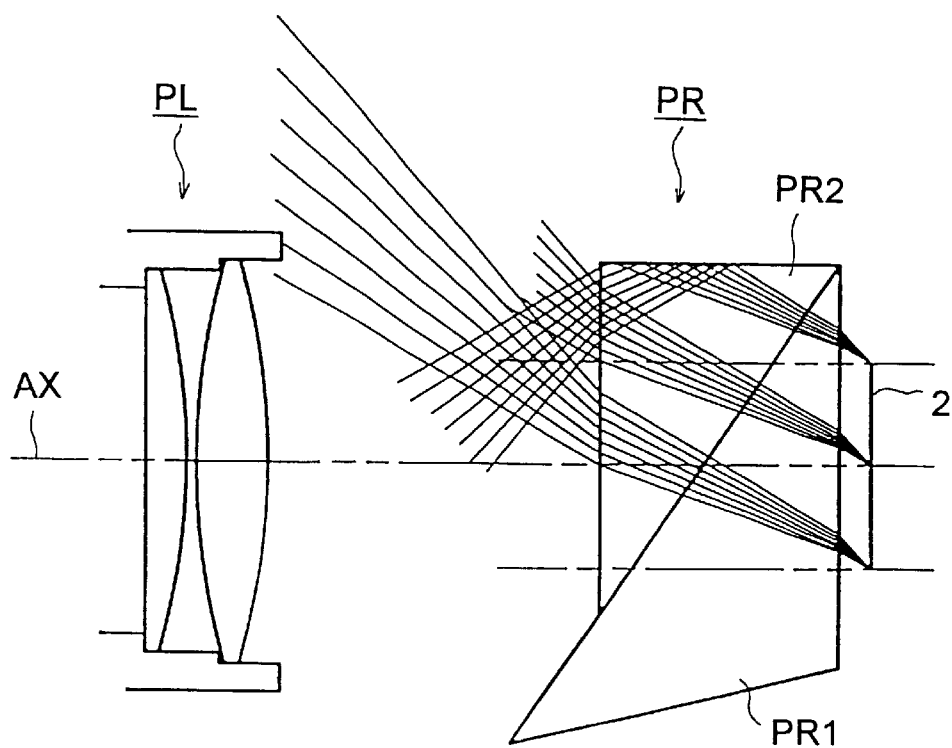
FIG. 20 is an optical construction diagram showing the optical path observed when the micromirrors of the DMD are in an OFF state in the third conventional example.

Ai represents the aspherical surface coefficient of order i;

FIGS. 9A, 9B, and 9C are diagrams showing the aberrations observed in the projection optical system (PL) of Example 1, and FIGS. 11A, 11B, and 11C are diagrams showing the aberrations observed in the illumination optical system (IL) of Example 1. FIGS. 13A, 13B, and 13C are diagrams showing the aberrations observed in the projection optical system (PL) of Example 2, and FIGS. 15A, 15B, and 15C are diagrams showing the aberrations observed in the illumination optical system (IL) of Example 2. All of these aberration diagrams show the aberrations observed on the DMD (2) side of the optical system, with an object located at a finite distance. Of these diagrams, FIGS. 9A, 11A, 13A and 15A show spherical aberration, FIGS. 9B, 11B, 13B and 15B show astigmatism, and FIGS. 9C, 11C, 13C and 15C show distortion, with the symbol Y' representing the maximum image height. In the diagrams showing spherical aberration, the solid line (d) represents the spherical aberration for the d line, the dash-and-dot line (g) represents the spherical aberration for the g line, and the broken line (SC) represents the sine condition. In the diagrams showing astigmatism, the broken line (DM) represents the astigmatism for the d line observed on the meridional plane, and the solid line (DS) represents the astigmatism for the d line observed on the sagittal plane. In the diagrams showing distortion, the solid line represents the distortion for the d line.

As described above, according to the present invention, light is transmitted in a non-telecentric state between an illumination optical system and a projection optical system. This helps prevent OFF light from entering the projection optical system. As a result, it is possible to obtain high contrast in projected images. Moreover, the non-telecentric state helps reduce the burden on the projection optical system in terms of aberration correction and thereby achieve higher optical performance.

TABLE 1

<<Construction Data of the Projection Optical System (PL) of Example 1>>
$\beta = -0.013298$, D1 = $-940$ (mm), $F_{eff} = 4.00$

| Radius of Curvature | Axial Distance | Refractive Index | Abbe Number |
|---|---|---|---|
| r1 = 128.643 | | | |
| | d1 = 3.400 | N1 = 1.49700 | v1 = 81.61 |
| r2 = 19.866 | | | |
| | d2 = 6.900 | | |
| r3 = 31.541 | | | |
| | d3 = 4.300 | N2 = 1.49300 | v2 = 58.34 |
| r4* = 18.345 | | | |
| | d4 = 34.000 | | |
| r5 = 22.373 | | | |
| | d5 = 2.400 | N3 = 1.61800 | v3 = 63.39 |
| r6 = 12.227 | | | |
| | d6 = 2.100 | | |
| r7 = 16.628 | | | |
| | d7 = 2.400 | N4 = 1.67339 | v4 = 29.25 |
| r8 = −399.082 | | | |
| | d8 = 0.000 | | |
| r9 = ∞ (Aperture Stop) . . . (SP) | | | |
| | d9 = 9.450 | | |
| r10 = −50.979 | | | |
| | d10 = 2.500 | N5 = 1.75520 | v5 = 27.53 |
| r11 = 20.485 | | | |
| | d11 = 6.200 | N6 = 1.61800 | v6 = 63.39 |
| r12 = −22.020 | | | |
| | d12 = 1.600 | | |
| r13 = −9048.956 | | | |
| | d13 = 1.800 | N7 = 1.68150 | v7 = 36.64 |
| r14 = 24.696 | | | |
| | d14 = 3.800 | | |
| r15 = −196.973 | | | |
| | d15 = 4.300 | N8 = 1.49700 | v8 = 81.61 |
| r16 = −27.221 | | | |
| | d16 = 0.300 | | |
| r17 = 34.349 | | | |
| | d17 = 7.200 | N9 = 1.49700 | v9 = 81.61 |
| r18 = −37.552 | | | |
| | d18 = 7.000 | | |
| r19 = ∞ | | | |
| | d19 = 24.000 | N10 = 1.51680 | v10 = 64.20 |
| r20 = ∞ | | | |
| | d20 = 3.000 | | |
| r21 = ∞ | | | |
| | d21 = 2.750 | N11 = 1.50847 | v11 = 61.19 |
| r22 = ∞ | | | |

[Aspherical Surface Data of the Forth Surface(r4)]

$\epsilon = 0.0$
$A4 = -0.14732 \times 10^{-4}$
$A6 = -0.25711 \times 10^{-7}$
$A8 = -0.31031 \times 10^{-10}$

TABLE 2

<<Construction Data of the Illumination Optical System (IL) of Example 1>>
$\beta = -3.92155$, S1 = $-7.7$ (mm), $F_{eff} = 4.00$

| Radius of Curvature | Axial Distance | Refractive Index | Abbe Number |
|---|---|---|---|
| r1 = −548.920 | | | |
| | d1 = 5.500 | N1 = 1.62041 | v1 = 60.34 |

TABLE 2-continued

<<Construction Data of the Illumination Optical System (IL) of Example 1>>
$\beta = -3.92155$, S1 = -7.7 (mm), $F_{eff} = 4.00$

| Radius of Curvature | Axial Distance | Refractive Index | Abbe Number |
|---|---|---|---|
| r2* = -11.206 | | | |
| | d2 = 8.800 | | |
| r3 = 188.672 | | | |
| | d3 = 1.500 | N2 = 1.75520 | ν2 = 27.53 |
| r4 = 14.311 | | | |
| | d4 = 10.000 | N3 = 1.62041 | ν3 = 60.34 |
| r5 = -18.584 | | | |
| | d5 = 0.000 | | |
| r6 = ∞ (Aperture Stop) . . . (SP) | | | |
| | d6 = 75.600 | | |
| r7 = 40.100 | | | |
| | d7 = 5.500 | N4 = 1.62041 | ν4 = 60.29 |
| r8 = ∞ | | | |
| | d8 = 0.000 | | |
| r9 = ∞ | | | |
| | d9 = 18.731 | N5 = 1.51680 | ν5 = 64.20 |
| r10 = ∞ | | | |
| | d10 = 19.572 | N6 = 1.51680 | ν6 = 64.20 |
| r11 = ∞ | | | |
| | d11 = 3.192 | | |
| r12 = ∞ | | | |
| | d12 = 2.823 | N7 = 1.51680 | ν7 = 64.20 |
| r13 = ∞ | | | |

[Aspherical Surface Data of the Second Surface (r2)]

$\epsilon = 0.50000$

TABLE 3

<<Actual Values of Conditions (I) and (II), in Example 1 and Related Data>>

L = 10.2, Fa = Fb = 4, $\theta_D = \pm 10$
xa = 411.9, xb = 423.5
Lower Limit: $L/[\tan\{\theta_D - \sin^{-1}(1/(2 \cdot Fa))\}] = L/[\tan\{\theta_D - \sin^{-1}(1/(2 \cdot Fb))\}] = 207.13$
Upper Limit: $L/[\tan(\theta_D - 0.87\,\theta_D)] = 449.47$

TABLE 4

<<Construction Data of the Projection Optical System (PL) of Example 2>>
$\beta = -0.137646$, S1 = -502.7 (mm), $F_{eff} = 6.00$

| Radius of Curvature | Axial Distance | Refractive Index | Abbe Number |
|---|---|---|---|
| r1 = 55.179 | | | |
| | d1 = 3.000 | N1 = 1.49310 | ν1 = 83.58 |
| r2 = 32.871 | | | |
| | d2 = 5.000 | | |
| r3 = 49.759 | | | |
| | d3 = 3.000 | N2 = 1.49310 | ν2 = 83.58 |
| r4 = -225.536 | | | |
| | d4 = 1.000 | | |
| r5 = 16.338 | | | |
| | d5 = 4.400 | N3 = 1.61800 | ν3 = 63.39 |
| r6 = 36.055 | | | |
| | d6 = 1.900 | N4 = 1.54072 | ν4 = 47.20 |
| r7 = 14.631 | | | |
| | d7 = 7.700 | | |
| r8 = ∞ (Aperture Stop) . . . (SP) | | | |
| | d8 = 14.700 | | |
| r9 = -12.340 | | | |
| | d9 = 1.900 | N5 = 1.54072 | ν5 = 47.20 |
| r10 = 104.809 | | | |
| | d10 = 2.400 | | |

TABLE 4-continued

<<Construction Data of the Projection Optical System (PL) of Example 2>>
$\beta = -0.137646$, S1 = -502.7 (mm), $F_{eff} = 6.00$

| Radius of Curvature | Axial Distance | Refractive Index | Abbe Number |
|---|---|---|---|
| r11 = 258.924 | | | |
| | d11 = 4.400 | N6 = 1.49310 | ν6 = 83.58 |
| r12 = -23.400 | | | |
| | d12 = 1.000 | | |
| r13 = -47.793 | | | |
| | d13 = 4.000 | N7 = 1.49310 | ν7 = 83.58 |
| r14 = -22.460 | | | |
| | d14 = 0.500 | | |
| r15 = -172.048 | | | |
| | d15 = 3.500 | N8 = 1.49310 | ν8 = 83.58 |
| r16 = -57.910 | | | |
| | d16 = 1.500 | | |
| r17 = 782.234 | | | |
| | d17 = 3.500 | N9 = 1.49310 | ν9 = 83.58 |
| r18 = -96.762 | | | |
| | d18 = 23.870 | | |
| r19 = ∞ | | | |
| | d19 = 32.500 | N10 = 1.51680 | ν10 = 64.20 |
| r20 = ∞ | | | |
| | d20 = 4.000 | | |
| r21 = ∞ | | | |
| | d21 = 3.000 | N11 = 1.50847 | ν11 = 61.19 |
| r22 = ∞ | | | |

TABLE 5

<<Construction Data of the Illumination Optical System (IL) of Example 2>>
$\beta = -6.0$, S1 = -16 (mm), $F_{eff} = 6.00$

| Radius of Curvature | Axial Distance | Refractive Index | Abbe Number |
|---|---|---|---|
| r1 = -64.315 | | | |
| | d1 = 4.500 | N1 = 1.77250 | ν1 = 49.77 |
| r2 = -22.913 | | | |
| | d2 = 9.900 | | |
| r3 = -182.799 | | | |
| | d3 = 4.500 | N2 = 1.77250 | ν2 = 49.77 |
| r4 = -43.896 | | | |
| | d4 = 18.800 | | |
| r5 = ∞ (Aperture Stop) . . . (SP) | | | |
| | d5 = 0.000 | | |
| r6 = 155.336 | | | |
| | d6 = 3.100 | N3 = 1.80518 | ν3 = 25.43 |
| r7 = 29.603 | | | |
| | d7 = 10.000 | N4 = 1.62041 | ν4 = 60.29 |
| r8 = -63.674 | | | |
| | d8 = 260.000 | | |
| r9 = 95.098 | | | |
| | d9 = 6.500 | N5 = 1.77250 | ν5 = 49.77 |
| r10 = ∞ | | | |
| | d10 = 10.000 | | |

TABLE 5-continued

<<Construction Data of the Illumination Optical System (IL) of Example 2>>
$\beta = -6.0, S1 = -16 \text{ (mm)}, F_{eff} = 6.00$

| Radius of Curvature | Axial Distance | Refractive Index | Abbe Number |
|---|---|---|---|
| r11 = ∞ | | | |
| | d11 = 22.273 | N6 = 1.51680 | ν6 = 64.20 |
| r12 = ∞ | | | |
| | d12 = 24.602 | N7 = 1.51680 | ν7 = 64.20 |
| r13 = ∞ | | | |
| | d13 = 15.958 | | |
| r14 = ∞ | | | |
| | d14 = 3.080 | N8 = 1.50847 | ν8 = 61.19 |
| r15 = ∞ | | | |

TABLE 6

<<Actual Values of Conditions (I) and (II), in Example 2 and Related Data>>

L = 11.2, Fa = Fb = 6, $\theta_D$ = ±10
xa = 155.8, xb = 151.4
Lower Limit: $L/[\tan(\theta_D - \sin^{-1}(1/(2 \cdot Fa)))] = L/[\tan\{\theta_D - \sin^{-1}(1/(2 \cdot Fb))\}] = 122.60$
Upper Limit: $L/\tan(\theta_D - 0.87 \Theta_D) = 493.54$

What is claimed is:

1. A projection optical apparatus comprising:
   a light source for radiating light;
   an illumination optical system for emitting as illumination light the light radiated from the light source;
   a Digital Micromirror Device™, having a plurality of micromirrors, for separating the illumination light into signal light and unnecessary light by varying, in accordance with a signal, angles at which the individual micromirrors reflect the illumination light shone thereon;
   a total internal reflection prism composed of a first prism for totally reflecting and thereby directing the illumination light exiting from the illumination optical system to the Digital Micromirror Device™ and a second prism for transmitting the signal light reflected from the Digital Micromirror Device™; and
   a projection optical system for projecting the signal light transmitted through the second prism onto a projection surface,
   wherein the following condition is fulfilled:

$$L/[\tan\{\theta_D - \sin^{-1}(1/(2 \cdot Fa))\}] \leq xa \leq L/\tan(\theta_D - 0.87\ \theta_D)$$

where
   Fa represents an f/number of the illumination optical system on a Digital Micromirror Device™ side thereof, which falls within a range $1/\{2 \sin(0.85\ \theta_D)\} \leq Fa \leq 1/\{2 \sin(0.3\ \theta_D)\}$;
   xa represents a distance from the Digital Micromirror Device™ to a Digital Micromirror Device™ side pupil of the illumination optical system;
   L represents a distance from an optical axis position of the Digital Micromirror Device™ to a most off-axial position thereof; and
   $\theta_D$ represents a rotation angle of the micromirrors constituting the Digital Micromirror Device™.

2. A projection optical apparatus as claimed in claim 1, wherein the illumination optical system includes smoothing means for smoothing intensity distribution of the illumination light.

3. A projection optical apparatus as claimed in claim 2, wherein the smoothing means is realized as an integrator rod disposed in an optical path.

4. A projection optical apparatus as claimed in claim 2, wherein the smoothing means is realized as two lens arrays disposed in an optical path.

5. A projection optical apparatus as claimed in claim 1, wherein the second prism is provided with internal reflection inhibiting means for preventing the unnecessary light from traveling toward the projection optical system.

6. A projection optical apparatus as claimed in claim 5, wherein the internal reflection inhibiting means is realized as a sawtooth-shaped sheet cemented to a surface which the unnecessary light strikes.

7. A projection optical apparatus as claimed in claim 1, wherein the following condition is fulfilled:

$$L/[\tan\{\theta_D - \sin^{-1}(1/(2 \cdot Fb))\}] \leq xb \leq L/\tan(\theta_D - 0.87\ \theta_D)$$

where
   Fb represents an f/number of the projection optical system on a Digital Micromirror Device™ side thereof, which falls within a range $1/\{2 \sin(0.85\ \theta_D)\} \leq Fb \leq 1/\{2 \sin(0.3\ \theta_D)\}$; and
   xb represents a distance from the Digital Micromirror Device™ to a Digital Micromirror Device™ side pupil of the projection optical system.

8. A projection optical apparatus as claimed in claim 1, wherein an optical element disposed at a Digital Micromirror Device™ side end of the illumination optical system is disposed with an inclination relative to an optical axis of the illumination optical system.

* * * * *